United States Patent
Humphris et al.

(10) Patent No.: US 9,410,982 B2
(45) Date of Patent: Aug. 9, 2016

(54) PHOTOTHERMAL ACTUATION OF A PROBE FOR SCANNING PROBE MICROSCOPY

(71) Applicant: INFINITESIMA LIMITED, Oxford, Oxfordshire (GB)

(72) Inventors: Andrew Humphris, Abingdon (GB); Bin Zhao, Oxford (GB)

(73) Assignee: INFINITESIMA LIMITED, Abingdon (GB)

(*) Notice: Subject to any disclaimer, the term of this patent is extended or adjusted under 35 U.S.C. 154(b) by 0 days.

(21) Appl. No.: 14/424,597

(22) PCT Filed: Jul. 30, 2013

(86) PCT No.: PCT/GB2013/052033
§ 371 (c)(1),
(2) Date: Feb. 27, 2015

(87) PCT Pub. No.: WO2014/033430
PCT Pub. Date: Mar. 6, 2014

(65) Prior Publication Data
US 2015/0219684 A1 Aug. 6, 2015

(30) Foreign Application Priority Data

| Aug. 31, 2012 | (GB) | 1215546.1 |
| Aug. 31, 2012 | (GB) | 1215547.9 |
| Oct. 12, 2012 | (GB) | 1218350.5 |
| Jan. 29, 2013 | (WO) | PCT/GB2013/050194 |
| Jan. 29, 2013 | (WO) | PCT/GB2013/050195 |

(51) Int. Cl.
*G01Q 10/00* (2010.01)
*G01Q 10/04* (2010.01)
*G01Q 20/02* (2010.01)

(52) U.S. Cl.
CPC .............. *G01Q 10/00* (2013.01); *G01Q 10/045* (2013.01); *G01Q 20/02* (2013.01)

(58) Field of Classification Search
CPC ....... G01Q 10/00; G01Q 10/02; G01Q 10/04; G01Q 10/045; G01Q 10/06; G01Q 10/065; G01Q 20/00; G01Q 20/02; G01Q 20/04; G01Q 60/00; G01Q 60/24; G01Q 60/38; B82Y 35/00
USPC .............. 850/1–6, 32, 33, 52, 62; 73/105
See application file for complete search history.

(56) References Cited

U.S. PATENT DOCUMENTS 5,861,550 A 1/1999 Ray
5,883,387 A * 3/1999 Matsuyama et al. ............ 850/59
(Continued)

FOREIGN PATENT DOCUMENTS

EP 1898204 A1 3/2008
WO 03019241 A2 3/2003
(Continued)

OTHER PUBLICATIONS

Vassalli et al, "Role of the Driving Laser Position on Atomic Force Microscopy Cantilevers Excited by Photothermal and Radiation Pressure Effects", Applied Physics Letters 97, 143105 (2010).*
(Continued)

*Primary Examiner* — Nicole Ippolito
*Assistant Examiner* — David E Smith
(74) *Attorney, Agent, or Firm* — Hauptman Ham, LLP

(57) ABSTRACT

Various methods of driving a probe of a scanning probe microscope are disclosed. One set of methods distribute the energy of a radiation beam over a wide area of the probe by either scanning the beam or increasing its illumination area. Another method changes the intensity profile of the radiation beam with a diffractive optical element, enabling a more uniform intensity profile across the width of the illumination. Another method uses a diffractive optical element to change the circumferential shape of the radiation beam, and hence the shape of the area illuminated on the probe, in order to match the shape of the probe and hence distribute the energy over a wider area.

19 Claims, 9 Drawing Sheets

(56) References Cited

U.S. PATENT DOCUMENTS

| | | | |
|---|---|---|---|
| 5,929,440 | A | 7/1999 | Fisher |
| 6,032,518 | A | 3/2000 | Prater et al. |
| 6,330,824 | B1 * | 12/2001 | Erie ............ B82Y 35/00 73/105 |
| 6,884,981 | B2 | 4/2005 | Proksch et al. |
| 7,958,565 | B2 | 6/2011 | Ando et al. |
| 2007/0195333 | A1 | 8/2007 | Negishi |
| 2009/0032706 | A1 | 2/2009 | Prater et al. |
| 2009/0313729 | A1 | 12/2009 | Ando et al. |
| 2014/0026263 | A1 | 1/2014 | Humphris |

FOREIGN PATENT DOCUMENTS

| | | | |
|---|---|---|---|
| WO | 2012104625 A1 | 8/2012 | |
| WO | WO 2012104625 A1 * | 8/2012 | ............ G01Q 10/065 |

OTHER PUBLICATIONS

Kato et al, "Wavelength Independent Grating Lens System", Applied Optics vol. 28, No. 4, 1989, p. 682-686.*

Yamashita et al, "Tip-Sample Distance Control Using Photothermal Actuation of a Small Cantilever for High-Speed Atomic Force Microscopy", Review of Scientific Instruments 78, 083702 (2007).*

Allegrini et al. "Laser thermal effects on atomic force microscope cantilevers" Ultramicroscopy 42-44:371-378 (1992).

Fu et al. "Selective photothermal self-excitation of mechanical modes of a micro-cantilever for force microscopy" Applied Physics Letter 99, 173501-1-173501-3 (2011).

Kadri et al. "Analysis of photothermally induced vibration in metal coated AFM cantilever" Proc. of SPIE, 7743:774307-1-774307-6 (2010).

Marti et al. "Mechanical and thermal effects of laser irradiation on force microscope cantilevers" Ultramicroscopy, 42-44:345-350 (1992).

Nishida et al. "Photothermal excitation of a single-crystalline silicon cantilever for higher vibration modes in liquid" Journal of Vacuum Science & Technology, B27(2):964-968 (Mar./Apr. 2009).

Paoletti et al. "Self driven soft imaging in liquid by means of photothermal excitation" Journal of Applied Physics, 110:114315-1-1114315-6 (2011).

Ramos et al. "Photothermal excitation of microcantilevers in liquids" Journal of Applied Physics, 99:124904-1-124904-8 (2006).

Umeda et al. "Scanning attractive force microscope using photothermal vibration" Journal of Vacuum Science & Technology, B9, 2(2):1318-1322 (Mar./Apr. 1991).

Vassalli et al. "Role of the driving laser position on atomic force microscopy cantilevers excited by photothermal and radiation pressure effects" Applied Physics Letters, 97:143105-1-143105-3 (2010).

Yamashita et al. "Tip-sample distance control using photothermal actuation of a small cantilever for high-speed atomic force microscopy" AIP Review of Scientific Instruments, 78:083702-1-083702-5 (2007).

* cited by examiner

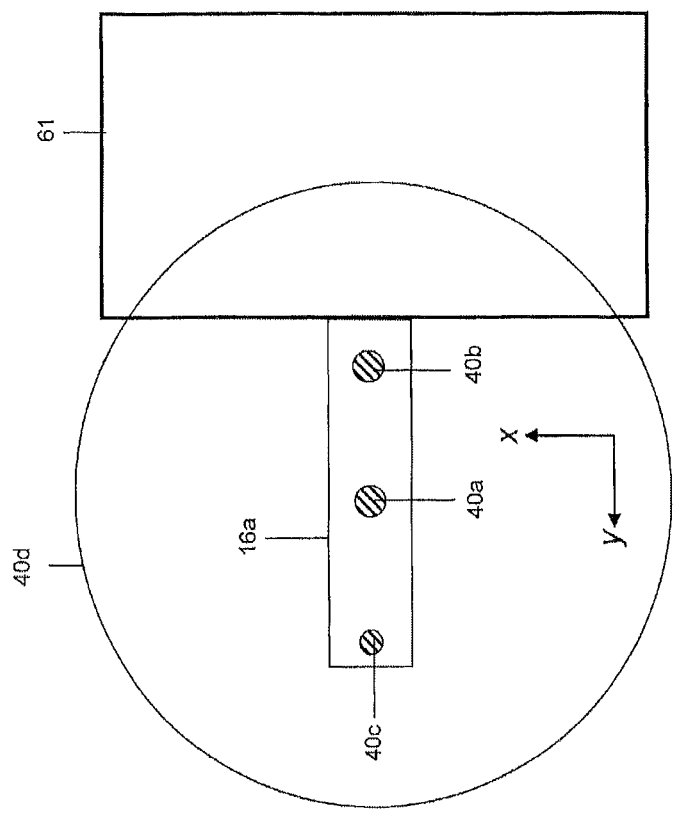
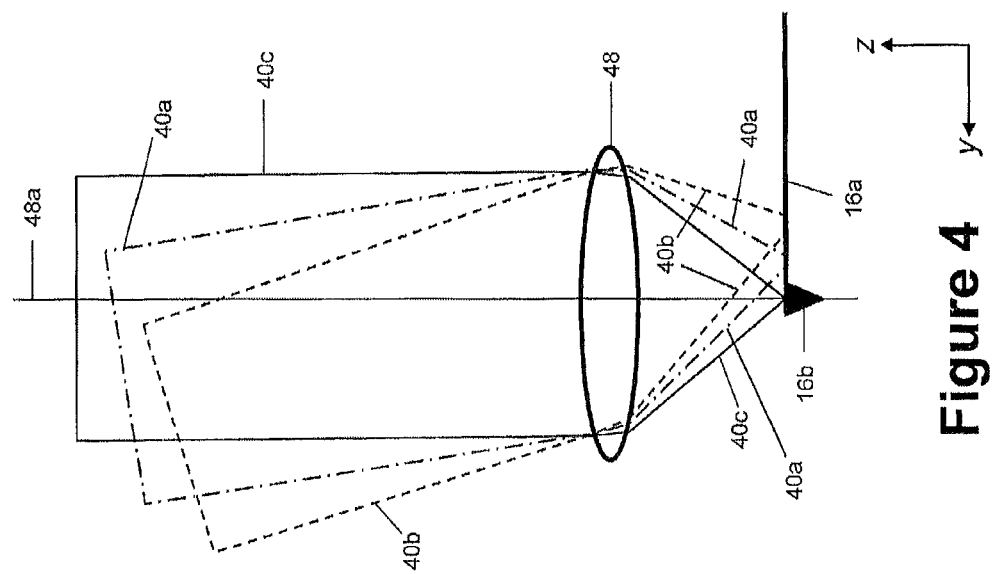
Figure 5
Figure 4

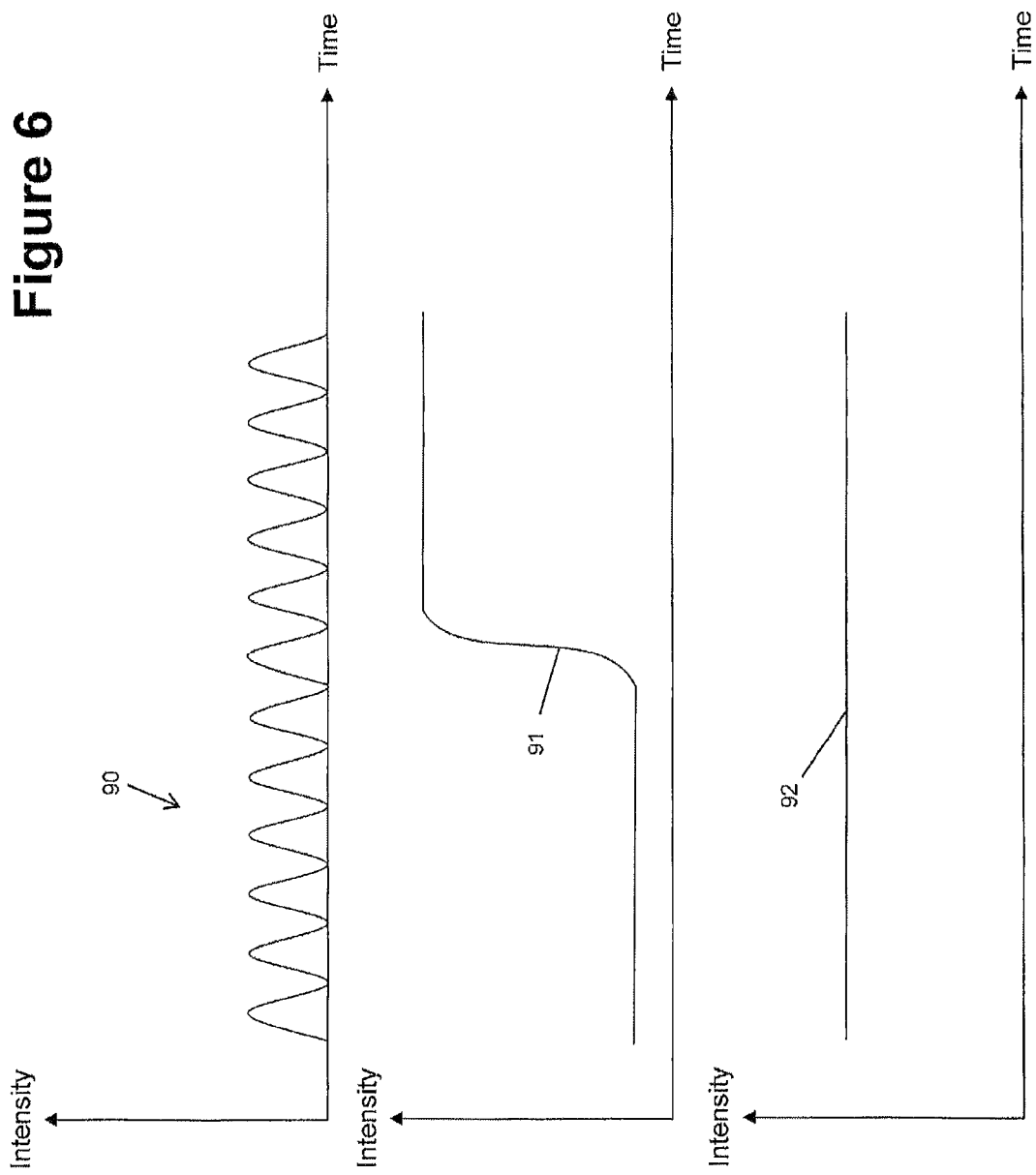

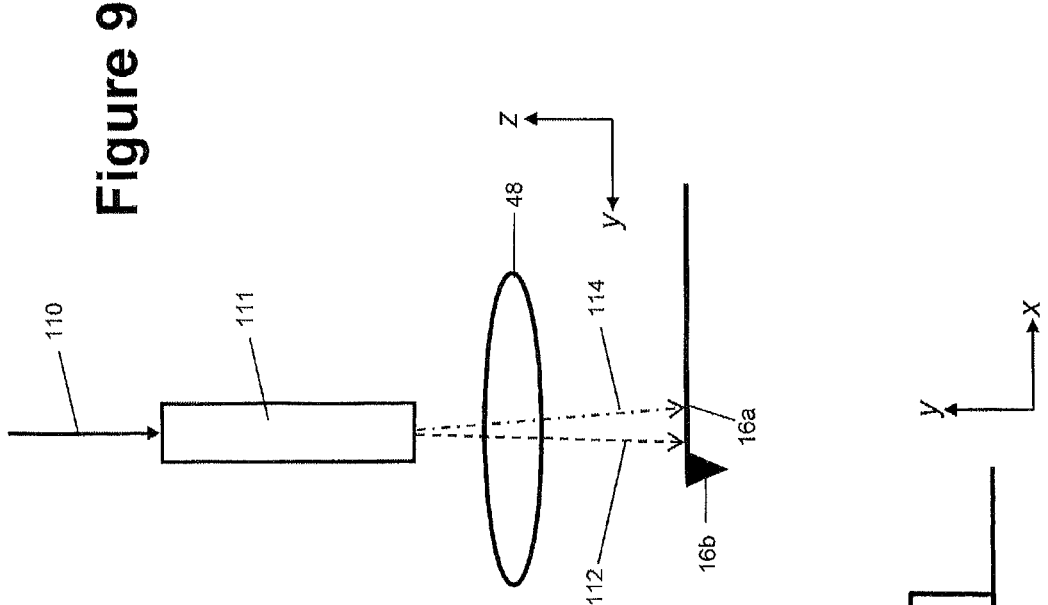
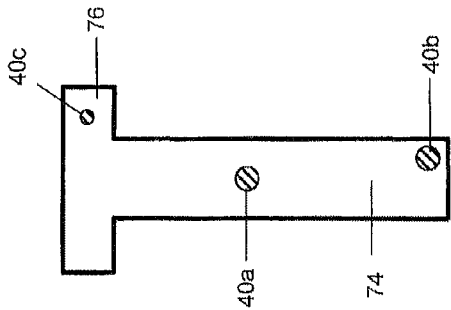
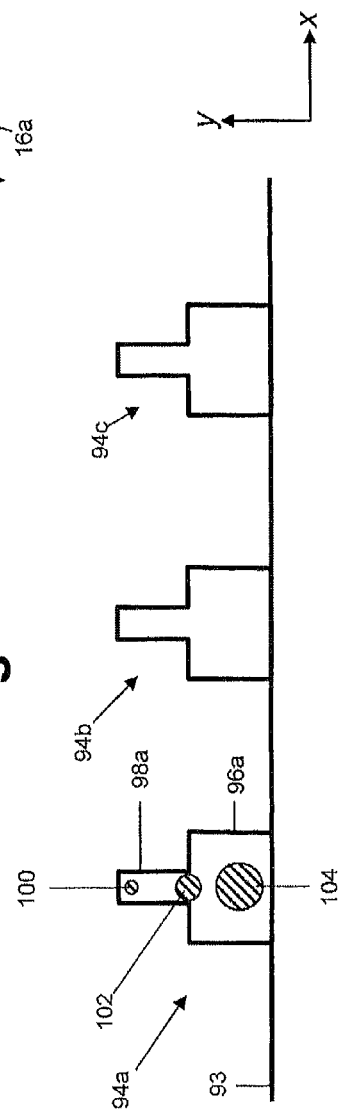

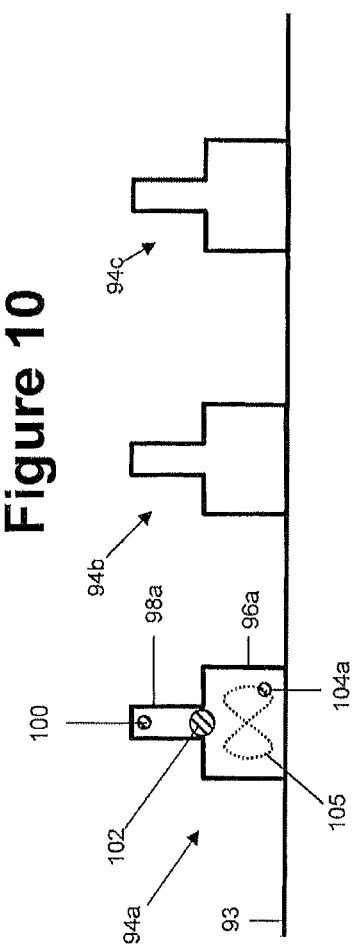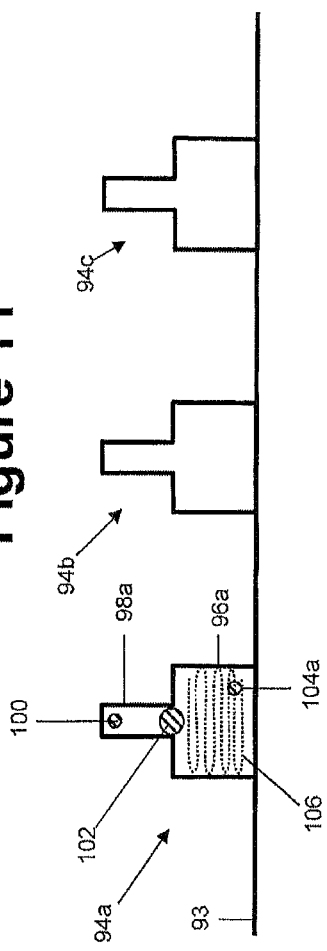

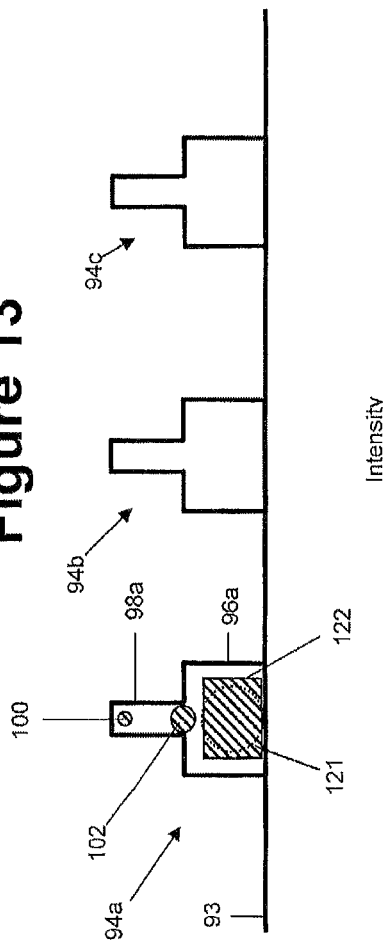
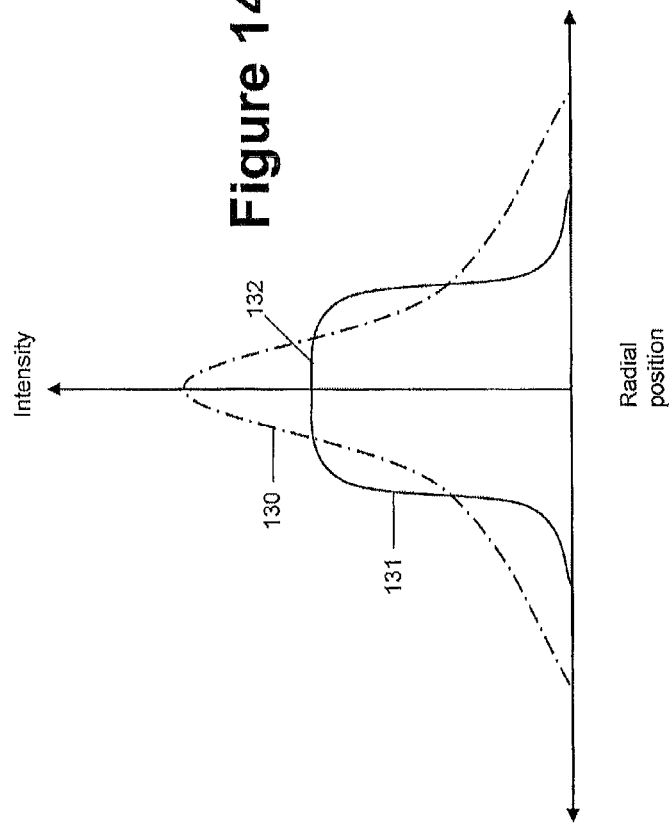
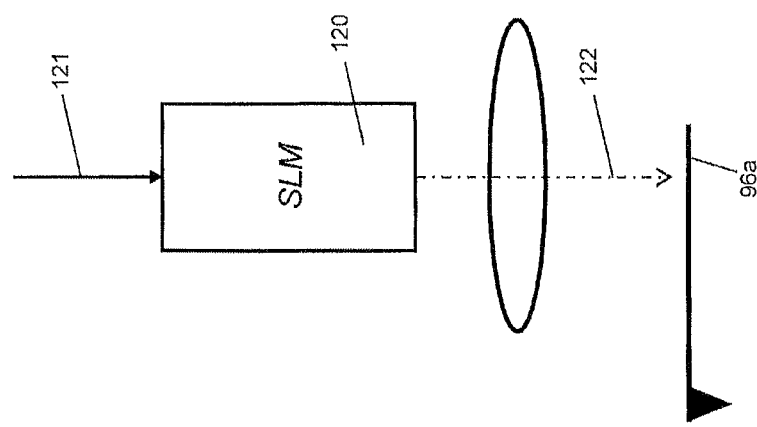

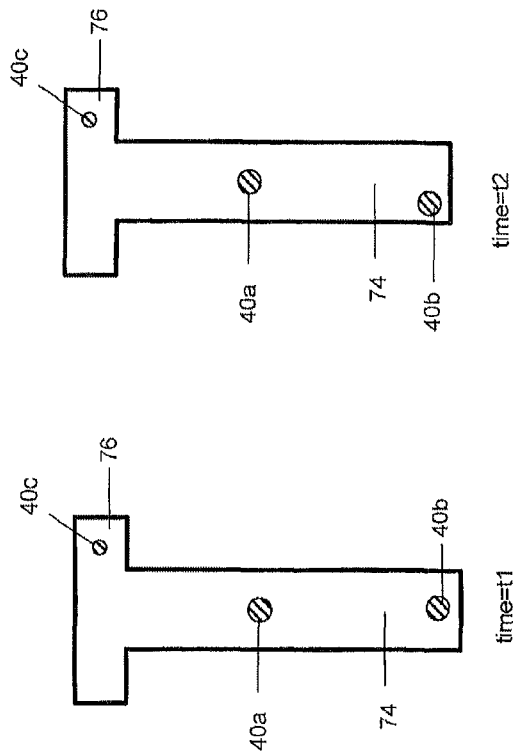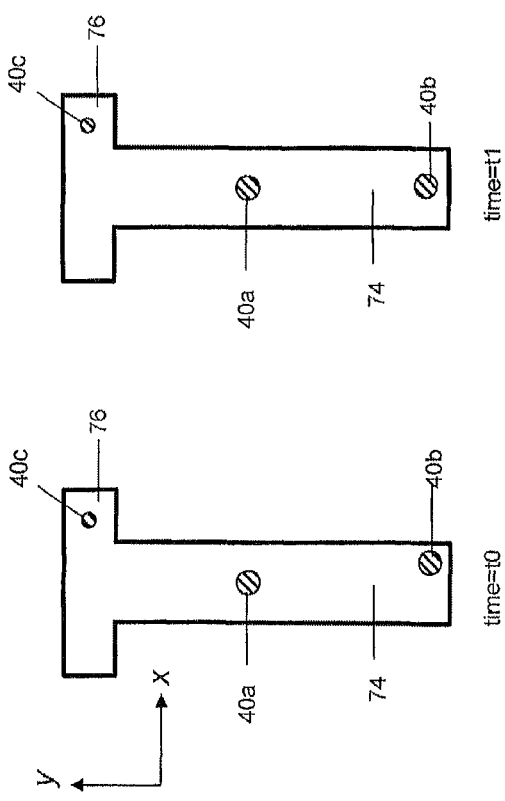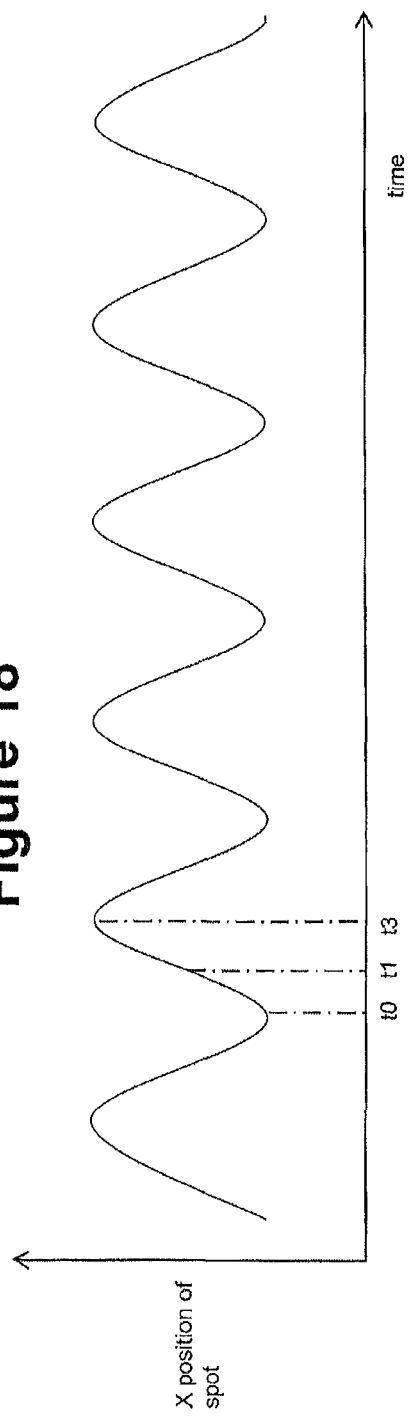
Figure 15 Figure 16 Figure 17
Figure 18

PHOTOTHERMAL ACTUATION OF A PROBE FOR SCANNING PROBE MICROSCOPY

FIELD OF THE INVENTION

The present invention relates to a method of driving a probe of a scanning probe microscope, apparatus for use in such a method, and a scanning probe microscope.

BACKGROUND OF THE INVENTION

H. Yamashita, T. Uchihashi, N. Kodera, A. Miyagi, D. Yamamoto, and T. Ando, "Tip-sample distance control using photo-thermal actuation of a small cantilever for high-speed atomic force microscopy", *Rev. Sci. Instrum.* 78:083702 (5 pages) (2007) describes an atomic force microscope (AFM) in which photothermal bending of a cantilever is induced by an intensity-modulated infrared laser. A red laser is also used to detect deflection of the cantilever. Both lasers are focused onto the cantilever by an objective lens.

SUMMARY OF THE INVENTION

A problem with photo-thermal actuation, which has not previously been acknowledged in the art, is that the speed or range of motion of the probe may be limited, or the probe may develop "hot spots" which can cause damage to the probe. Various aspects of the present invention provide a range of different solutions to these problems by distributing the energy of the radiation beam over a tailored area of the probe by either scanning (i.e. moving) the beam over the probe, or changing its spot size, shape or intensity profile (in which case the beam can be static or moving relative to the probe). The radiation beam may be distributed by a diffractive optical element.

In the case where the radiation beam heats the probe, then the various aspects of the invention can overcome the localised heating of the probe and solve the "hot-spots" problem mentioned above. However in a more general sense the various aspects of the invention enable the energy of the beam to be selectively directed in a tailored manner to particular parts of the probe where the energy can be applied more effectively, thereby improving the performance of the actuation system.

A first aspect of the invention provides a method of driving a probe of a scanning probe microscope, the method comprising: directing a radiation beam onto a surface of the probe so as to cause the probe to deform; and scanning the radiation beam over the surface of the probe. The first aspect also provides an actuation system for driving a probe of a scanning probe microscope, the system comprising: an optical system arranged to direct a radiation beam onto the probe so as to cause the probe to deform; and a scanning system arranged to scan the radiation beam over the surface of the probe.

The first aspect of the invention enables the energy of the radiation beam to be directed onto the probe in a tailored and dynamic manner. Scanning the radiation beam generates a flying spot which can be directed as required to different parts of the probe thereby selectively coupling energy into the probe.

Note that the term "scanning" is used to refer to an arrangement in which the radiation beam moves continuously over the surface of the probe to create a flying spot, rather than an arrangement in which the radiation beam is turned on and off as it is directed to different locations thereby generating a series of static spots. Note however that the term "scanning" does not preclude the possibility that the radiation beam (and the spot generated by the beam) may be stationary relative to the probe, or may be turned off, at some times during the process.

The scanning system may comprise a modulator device such as an electro-optical-modulator (EOM) or an acousto-optical-modulator (AOM); or a mirror which is arranged to sequentially vary an angle of the radiation beam to scan it over the surface of the probe, optionally via an objective lens.

The intensity of the radiation beam may remain constant during scanning, but more typically the method further comprises modulating an intensity of the radiation beam with a modulation system as it is continuously scanned over the surface of the probe.

The radiation beam may move across the surface of the probe in a straight path in one direction only. However more typically the radiation beam moves in a number of different directions relative to the probe as it is scanned over the surface of the probe—for instance it may follow a curved path (such as a Lissajous figure or raster pattern) or it may move back and forth along a straight line. Typically the radiation beam follows a closed path (such as a circle or Lissajous figure) as it is scanned over the surface of the probe.

The radiation beam moves relative to the probe as it is directed onto the probe. Preferably the radiation beam generates a spot on the probe which moves relative to the probe at a velocity greater than 1 m/s, more preferably greater than 10 m/s.

The microscope typically further comprises a probe support; wherein the probe has a proximal portion adjacent to the probe support and a distal portion remote from the probe support. Typically the distal portion is narrower than proximal portion, although they may have the same width. Typically the optical system is arranged to direct the radiation beam onto the proximal portion of the probe.

A second aspect of the invention provides a method of driving a probe of a scanning probe microscope, the method comprising: receiving energy from an input beam at a diffractive optical element; distributing the energy from the input beam with the diffractive optical element over a surface of the probe so as to cause the probe to deform; and changing over time an intensity or distribution of the energy being distributed over the surface of the probe. The second aspect of the invention also provides an actuation system for driving a probe of a scanning probe microscope, the system comprising: a radiation source for generating an input beam; a diffractive optical element arranged to receive energy from the input beam and distribute the energy from the input beam over a surface of the probe so as to cause the probe to deform; and a modulator arranged to change over time an intensity or distribution of the energy being distributed over the surface of the probe by the diffractive optical element.

The second aspect of the invention employs a diffractive optical element (DOE) which operates principally by diffraction to transform the input beam and thereby tailor the distribution of energy over the surface of the probe. The DOE may for example be a spatial light modulator (SLM), or a diffraction pattern such as a diffraction grating. Suitable SLMs are supplied by Boulder Nonlinear Systems, Colorado, USA such as their XY Series products and Hamamatsu such as their X10468 Series products. Other suitable DOEs are available from HOLO/OR Ltd., P.O. Box 1051, Rechovot, ISRAEL, see www.holoor.co.il.

Typically the diffractive optical element transforms the input beam to generate an output beam which distributes the energy from the input beam over the surface of the probe in a tailored manner. The diffractive optical element transforms the input beam principally by diffraction so that a size, shape or intensity profile of the energy distributed over the surface probe is different from what it would be in the absence of the diffractive optical element. For instance the DOE can control the size of the spot on the probe illuminated by the output beam. Alternatively (or in addition) the DOE can change the circumferential shape of the spot on the probe (for instance the spot may have a non-circular shape such as a square or rectangle, or it may be annular). Alternatively (or in addition) the DOE can change the intensity profile. For instance the intensity profile may have a top which is flatter than it would otherwise be in the absence of the DOE. In one example the intensity profile of the transformed output beam (and hence the distribution of energy on the probe) has a flat top, and the intensity profile of the input beam is Gaussian (as would be typical for a laser light source). Alternatively the DOE may transform the input beam so that it is split into a plurality of beamlets which distribute the energy from the input beam over the surface of the probe so that the intensity profile consists of an array of small spots or maxima.

The modulation system may change over time the intensity or distribution of the energy being distributed over the surface of the probe by modulating the input beam, and/or by operating an optical element between the diffractive optical element and the probe, and/or by operating the diffractive optical element.

Most preferably the modulation system changes over time the intensity of the energy being distributed over the surface of the probe by modulating an intensity of the input beam and/or by operating an optical element between the diffractive optical element and the probe. This is preferred because it enables the intensity to be modulated at a high frequency (diffractive optical elements generally being unable to modulate at a high frequency).

The microscope of the second aspect typically further comprises a probe support; wherein the probe has a proximal portion adjacent to the probe support and a distal portion remote from the probe support. Typically the distal portion is narrower than proximal portion, although they may have the same width. Typically the system is arranged to distribute the energy onto the proximal portion of the probe.

A third aspect of the invention provides an actuation system for driving a probe of a scanning probe microscope, the system comprising: a modulation system arranged to modulate the intensities of first and second radiation beams; and an optical system arranged to direct the first and second radiation beams onto the probe to form respective first and second illumination areas on the probe, wherein the first illumination area has a different size, shape or intensity profile than the second illumination area. The third aspect also provides a method of driving a probe of a scanning probe microscope, the method comprising: generating first and second radiation beams; modulating the intensities of the first and second radiation beams; and directing the first and second radiation beams onto the probe so as to cause the probe to deform, wherein the first and second radiation beams form respective first and second illumination areas on the probe, and the first illumination area has a different size, shape or intensity profile than the second illumination area. The first and second radiation beams can be static or moving relative to the probe.

The third aspect of the invention may distribute the energy of one of the radiation beams over a larger area of the probe than the other. For example an illumination spot generated by one beam may be larger (in total area) than the other. The larger area can avoid hot spots and/or improve the coupling effectiveness. A smaller area may be desirable where for example the illumination is required to excite a flexural or torsional mode of oscillation (and hence must be focused onto a relatively small area). The ratio of the difference in area between the illumination spots is typically greater than 1.5, and preferably greater than 2. In other words if the area of a smaller one of the spots is A, and the area of a larger one of the spots is B, then the ratio B/A is typically greater than 1.5 and preferably greater than 2. In an extreme example the ratio B/A could be as high as 100 or more. The area of the spots can be defined in a number of ways, such as the illumination area where the intensity of the spot is above a certain percentage of its maximum intensity.

The third aspect of the invention may alternatively distribute the energy of one of the radiation beams over an illumination area with a different shape than the other. For example the spot generated by one beam may have a different shape (for instance square) to the spot (for instance circular or elliptical) generated by the other beam.

The third aspect of the invention may alternatively distribute the energy of one of the radiation beams over an illumination area with a different intensity profile than the other. For example the intensity profile from one beam may have a top which is flatter than the other (which may for example have a Gaussian intensity profile).

The modulation system may be arranged to modulate the intensity of the first and second beams differently or with the same modulation.

The beams may be directed onto the probe by different respective lenses but more preferably the optical system comprises a lens arranged to receive the first and second radiation beams and direct them onto the probe to form the first and second illumination areas. Typically the optical system is arranged to direct the first and second radiation beams so that they enter the lens at different angles of incidence relative to its optical axis. The optical system may be configured so that the first radiation beam has a different beam angle (that is, a different degree of convergence or divergence) than the second radiation beam on entering the lens, and consequently has a different degree of convergence than the second radiation beam on exiting the lens.

The different illumination areas can be achieved in a number of ways. In some embodiments the optical system is configured so that one of the illumination areas is more focused than the other. In other embodiments the actuation system further comprises a diffractive optical element arranged to transform an input beam to generate the first or second radiation beam, the transformation causing the difference between the illumination areas.

Typically the modulation system is arranged to modulate the intensity of the first radiation beam in accordance with a first drive signal, and the modulation system is arranged to modulate the intensity of the second radiation beam in accordance with a second drive signal which is different to the first drive signal.

The modulation system may be arranged to modulate the intensity of the first radiation beam to select the probe by lowering it out of the plane of an array of probes, and the modulation system may be arranged to modulate the intensity of the second radiation beam to oscillate the probe.

The microscope may further comprise a probe support; wherein the probe has a relatively wide proximal portion adjacent to the probe support and a relative narrow distal portion remote from the probe support. The optical system is arranged to illuminate the proximal portion of the probe with one of the beams over a larger illumination area and the distal portion of the probe with the other one of the beams over a smaller illumination area.

A maximum amplitude of deflection of the probe caused by the larger one of the illumination areas may be at least ten times larger than a maximum amplitude of deflection of the probe caused by the smaller one of the illumination areas.

A fourth aspect of the invention provides a scanning probe microscope comprising: a probe; an actuation system for driving the probe, the actuation system comprising an actuation illumination system which is arranged to illuminate the probe with an actuation radiation beam to form an actuation illumination area on the probe, and a modulation system which is arranged to modulate the intensity of the actuation radiation beam; and a detection system for detecting movement of the probe, the detection system comprising a detection illumination system which is arranged to illuminate the probe with a detection radiation beam to form a detection illumination area on the probe, wherein the detection radiation beam is reflected by the probe to form a reflected detection radiation beam, and the detection system further comprises a detector which is arranged to receive the reflected detection radiation beam and generate an output that is representative of the movement of the probe, and wherein the actuation illumination area has a different size, shape or intensity profile than the detection illumination area.

The fourth aspect also provides a method of operating a scanning probe microscope, the method comprising: generating an actuation radiation beam and a detection radiation beam; modulating the intensity of the actuation radiation beam; directing the radiation beams onto the probe so that the actuation radiation beam forms an actuation illumination area on the probe and causes the probe to deform, and the detection radiation beam forms a detection illumination area on the probe and is reflected by the probe into a detector which senses movement of the probe, wherein the actuation illumination area has a different size, shape or intensity profile than the detection illumination area.

The fourth aspect of the invention distributes the energy of the actuation beam over the probe in a different manner to the detection beam. In other words the illumination spot generated by the actuation beam is different to the illumination spot generated by the detection beam. For the actuation beam this can avoid hot spots and/or improve the coupling effectiveness. A smaller spot may be desirable for the detection beam for sensing accuracy. Alternatively the actuation illumination area may have a flat topped intensity profile and the detection illumination area may have a Gaussian intensity profile.

The actuation beam can be static or moving relative to the probe.

The beams may be directed onto the probe by different respective lenses but more preferably a lens is arranged to receive the actuation beam and the detection beam and direct them both onto the probe to form the actuation and detection illumination areas. The actuation system and the detection system may be configured so that the actuation beam has a higher beam angle than the detection beam on entering the lens, and consequently is less convergent than the detection beam on exiting the lens.

The different illumination areas can be achieved in a number of ways. In some embodiments the actuation illumination system and the detection illumination system are configured so that the detection illumination area is more focused than the actuation illumination area. In other embodiments the actuation illumination system comprises a diffractive optical element arranged to transform an input beam to generate the actuation radiation beam, the transformation causing the difference between the illumination areas.

The detector may be based on interferometry, in which the reflected detection beam is combined with a reference beam to generate an interference pattern which provides a measure of a path difference or change in the path difference between the two beams and hence an indication of the instantaneous height of the probe. Alternatively the detector may use an optical lever arrangement.

The following comments apply to all of the above aspects of the invention.

The radiation beams may illuminate different sides of the probe but more typically both (or all) of the beams illuminate the same side of the probe.

Typically the probe comprises a cantilever which extends along a length of the cantilever from a proximal end adjacent to a probe support to a distal end remote from the probe support. The cantilever may comprise a single beam extending from a probe support, or a pair of beams which extend from a probe support and meet at their distal ends (forming a triangular structure).

Preferably at least part of the actuation radiation beam (or one of the actuation radiation beams) illuminates the cantilever towards the proximal end—in other words at a point which is no further than 50% along the length of the cantilever from the proximal end. Most preferably at least part of the actuation radiation beam (or one of the actuation radiation beams) illuminates the cantilever at a point which is no further than 25% along the length of the cantilever from the proximal end.

Preferably the illumination of the probe causes it to heat and deform by the photothermal effect. The term "photothermal effect" is used herein to refer in general terms to the deformation of the probe caused by the heating of the probe, such heating of the probe being induced by its illumination. Alternatively the illumination of the probe may cause it deform by some other mechanism such as by radiation pressure. Radiation pressure can be used in combination with highly reflective probe coatings and ideally some form of cavity, possibly a mirror attached to the probe.

The probe may remain stationary in the XY plane in which case no optical tracking system is required. In this case relative scanning (XY) motion between the probe and a sample being scanned by the probe can be generated by motion of the sample rather than motion of the probe.

Preferably the probe scans a sample, by moving the probe over the surface of the sample and/or by moving the sample relative to the probe, and the modulation system is arranged to modulate the intensity of the illumination at one or more of the two or more locations as the probe scans the sample. For example the intensity of the illumination at one of the locations may be modulated in response to a measured probe sample interaction so that the probe follows a profile of the surface of the sample.

It is preferable due to the probe fabrication process for the probe (and each layer of the probe where the probe has multiple layers) to have a uniform thickness along its length. However, the probe may have a thickness which varies along its length. For example the probe may have a relatively thick base (including a relatively thick metal layer) and a relatively thin distal end (including a relatively thin metal layer).

The deformation of the probe may be a bending, twisting, or any other motion of the probe.

A tracking system may be provided for moving the (or each) beam so as to track movement of the probe, thereby maintaining the location(s) on the probe at which the (or each) beam is directed.

The tracking system may comprise a beam steering mirror which reflects the beam towards the lens; and a mirror actuator for rotating the beam steering mirror (by tipping or tilting the mirror).

The actuation system may be provided as part of a scanning probe microscope comprising a probe. The probe may comprise a single material, or it may comprise two or more materials with different thermal expansion coefficients which are arranged so that the (or each) beam heats the probe and causes the probe to deform by the photothermal effect.

The scanning probe microscope may be used in a number of applications, including (but not limited to): material science and biological research, industrial inspection, semiconductor wafer and mask inspection and review; biosensing to detect multiple biomarkers; nanolithography, such as, dip pen nanolithography in which scanning probes deposit chemical compounds on a substrate; or data storage in which the probe has a heater allowing its temperature to be independently raised to melt a polymer substrate followed by an imprinting action by the probe producing a dent representing a binary digit.

Typically the scanning probe microscope is operated to obtain information from a sample scanned by the probe (scanning motion being achieved by moving the probe and/or moving the sample). The information obtained from the sample may be topographic information or any other kind of information (such as chemical and mechanical information about the sample or surface of the sample). The probe and microscope may be further adapted to measure other sample properties, such as magnetic or electric fields, via suitable interaction forces. Alternatively the scanning probe microscope may be operated to manipulate or modify a sample with the probe, for instance by removing or adding material such as to deposit chemical compounds on the sample or store data on the sample.

Typically the intensity of the probe illumination is modulated as the probe interacts with a sample (for instance to obtain information from the sample or manipulate/modify the sample).

The microscope may comprise an image collection module for compiling an image of a sample scanned by the probe.

BRIEF DESCRIPTION OF THE DRAWINGS

Embodiments of the invention will now be described with reference to the accompanying drawings, in which:

FIG. 4 is an enlarged view of the objective lens directing three beams onto the cantilever.

FIG. 5 shows schematically a cantilever, viewed from above, as it is illuminated by four separate light sources.

FIG. 6 shows the modulation intensity of the three actuation beams.

FIG. 7 shows the preferred positioning of three beams of the z actuation system on a different probe geometry.

FIG. 8 is a schematic illustration of an alternative thermal bimorph probe design showing preferred positioning of three actuation beams of the z actuation system.

FIG. 9 is a schematic illustration of an alternative z actuation system incorporating an AOM or EOM.

FIG. 10 shows an illumination system in which one of the actuation beams generates a flying spot following a Lissajous figure.

FIG. 11 shows an illumination system in which one of the actuation beams generates a flying spot following a raster pattern.

FIG. 12 is a schematic illustration of an alternative z actuation system incorporating an SLM.

FIG. 13 shows the square circumferential shape of the illumination spot generated by the SLM.

FIG. 14 shows the top-hat radial intensity profile or distribution generated by the SLM.

FIGS. 15-17 show three different positions of a flying spot at times t0, t1 and t2 respectively.

FIG. 18 shows the variation in X position of the flying spot with respect to time.

DETAILED DESCRIPTION OF EMBODIMENT(S)

Figure 1:
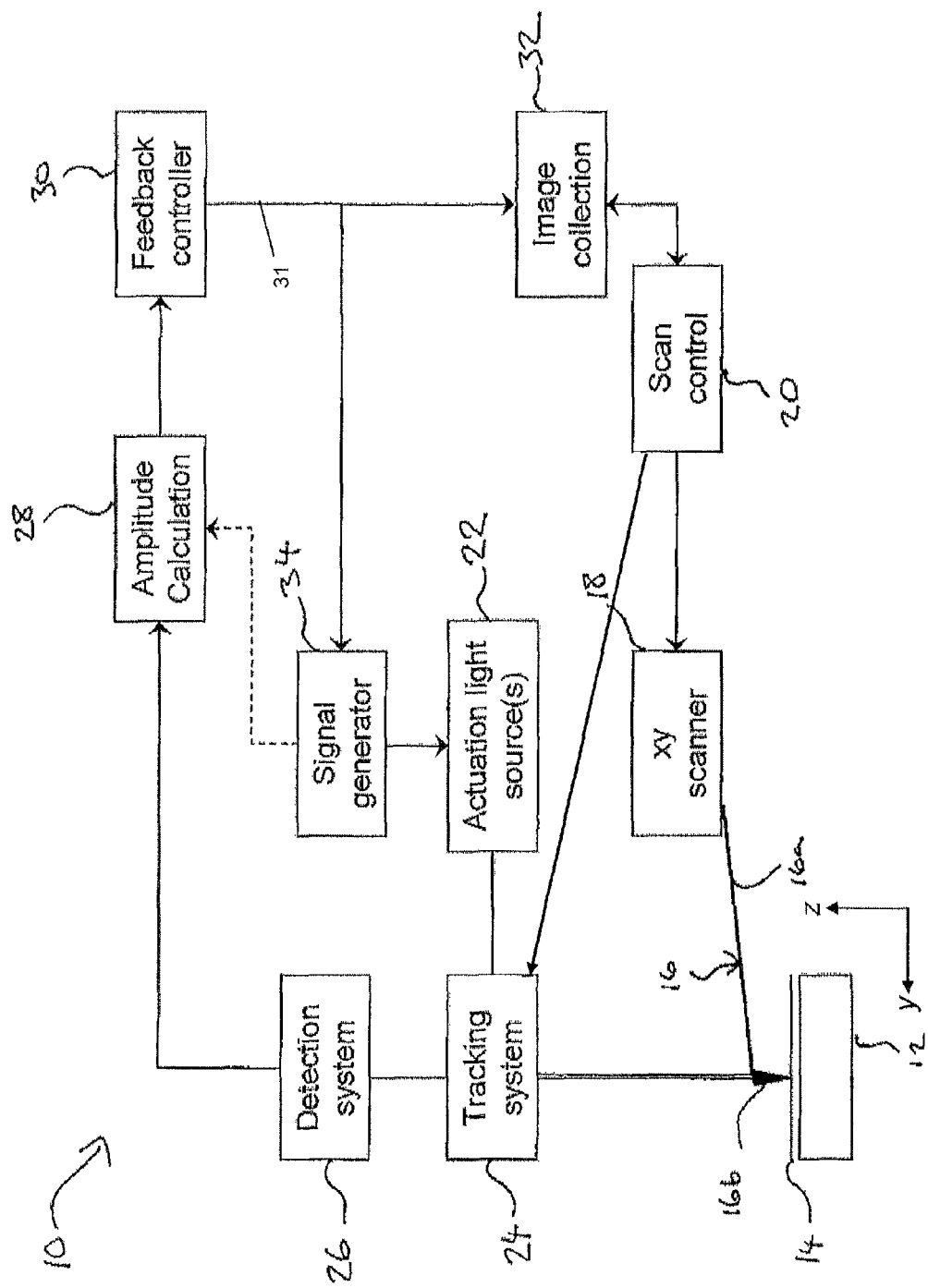
FIG. 1 is a schematic illustration of the components of an exemplary atomic force microscope that incorporates a z actuation system in accordance with an embodiment of the present invention.

With reference to FIG. 1, a novel microscope 10 that incorporates an embodiment of a z actuation system in accordance with the present invention is shown. The microscope 10 comprises a stage 12 on which a sample 14 to be investigated by a probe 16 is mounted. The probe 16 comprises a cantilever beam 16a and a tip 16b, which tapers to a fine point, and which is located towards a distal end of the cantilever beam. The cantilever beam 16a extends from a proximal end fixed to a mount to a distal end remote from the mount. The mount and probe 16 are connected to piezoelectric xy drivers 18 that are operable by a scan controller 20 to move the probe 16 across the sample surface in the plane (x,y) of the sample 14.

The cantilever 16a is of a type referred to as a thermal bimorph. That is, it is composed of two (or more) materials, with differing thermal expansions. Typically, this will be a silicon or silicon nitride base with a gold or aluminium coating. The coating extends the length of the cantilever 16a and covers the reverse side from the tip.

Actuation light sources 22 generate intensity-modulated radiation beams which are directed via a tracking system 24 onto the coated side of the cantilever. The wavelength of the light is selected for good absorption by the coating material. An optical system (not shown) directs the beams onto different locations on the cantilever 16a. The options for probe illumination and source arrangement will be discussed in more detail below. For the purposes of this overview, it suffices to understand that the bimorph probe 16 is illuminated in order to induce bending of the cantilever and so to adjust the z position of the tip.

A detection system 26 operates to collect a probe motion signal that is indicative of the deflection angle of the back of the cantilever above the probe tip 16b. Within the detection system 26, a detection light source (not shown in FIG. 1) emits a light beam which is directed, via the tracking system 24, onto an upper surface (back) of the cantilever beam 16a at the end at which the tip is mounted. Light reflected from the back of the cantilever propagates to a deflection detector (not shown explicitly in this figure), typically a split photodiode, which generates an output that is representative of the deflection of the cantilever. Note that this light reflected from the back of the cantilever is not shown in FIG. 1, or FIG. 3a or 4, to simplify the drawings. The output of the detection system is analysed by a processor 28 to extract information relating to the amplitude of probe oscillation. The processor 28 may alternatively be operated to extract other parameters indicative of probe position, for example deflection or phase. A feedback controller 30, in response to the measured oscillation amplitude, outputs a feedback signal 31 that is used to instruct adjustment of probe position in order to maintain a constant oscillation amplitude on adjustment of the probe—sample separation. This adjustment of the probe position is referred to below as z-position feedback. An image collection processor 32 receives the feedback signal 31 from the feedback controller 30, which represents the information about the surface of the sample obtained by the microscope 10, and this, along with knowledge of the xy scan pattern, is used to construct a map of the sample 14. Typically the feedback signal and thus map provide height information about the surface of the sample.

As stated above, the cantilever 16a is a thermal bimorph structure, the materials of which undergo differential expansion when heated. In one embodiment, the cantilever 16a is fabricated from silicon nitride with an aluminium coating. The actuation light sources 22 emit light of one or more wavelengths at which there is a maximum or peak in the absorption spectrum for the particular coating. For example the wavelength may be around the aluminium absorption peak at ~810 nm. Other coating/wavelength combinations can be used, for example gold has a higher absorption below 500 nm light. When this light is incident on the coating side of the cantilever 16a, the aluminium expands to a greater degree than the silicon nitride, bending the cantilever such that the tip moves downwards, towards the sample. If illumination intensity is increased, the tip 16b therefore moves closer to the sample surface. Conversely, if the intensity is lowered, bending is decreased and the tip 16b is moved away from the sample.

Clearly other arrangements of coating and base materials may result in different levels of bending in the same or opposite direction in response to illumination. The actuation light sources 22 are controlled by a signal generator 34 that, in turn, is linked to the feedback controller 30. The signal generator 34 therefore is operable to control intensity of light emitted from the actuation light sources 22, which in turn determines the degree of bend exhibited by the thermal bimorph probe (regardless of its material specifics) and so governs the tip—sample separation distance during the course of a scan.

The intensity of light emitted from the actuation light sources 22 varies as the scan progresses in accordance with parameters that will be described later. Essentially, the actuation light sources 22 can be considered to provide the drive mechanism for two different types of probe control: the z position feedback described above and probe oscillation (described in more detail below). That is, it is set to drive oscillation of the probe and to adjust the probe—sample separation distance during the course of a scan.

In taking an image of the sample 14, the microscope is operated as follows. The signal generator 34 provides a source signal that oscillates at the desired frequency and amplitude. This signal, on input to the actuation light sources 22, causes one of the beams of light emitted by the sources to modulate its intensity in relationship to the waveform of the signal.

When this modulated light is incident on the cantilever 16a, it causes a flexing of the cantilever that varies with the intensity modulation. The probe tip 16b is therefore driven towards and away from the sample at a frequency and amplitude that, in free space, is the same as that of the drive signal. This drives the probe oscillation necessary for many atomic force microscope (AFM) applications. In a typical AFM operating in a dynamic mode the probe oscillation may be at or near the mechanical resonance. Alternatively, the probe can be driven off-resonance, but still at a high frequency.

In operation, the probe 16 is irradiated by the modulated-intensity light beam, as described above, such that it oscillates with the desired free space amplitude. The signal generator 34 then, for example, increases its drive signal to one of the actuation light sources 22. This will be described in more detail below. In either case, the result is that the probe tip 16b is moved closer to the sample. The oscillation amplitude of the probe is reduced as the tip moves towards and interacts with the surface. Probe motion is monitored using the detection system 26. The output from the detection system 26 is passed to the processor 28, which extracts the amplitude of oscillation from the detector signal.

A feedback controller 30 calculates the difference between the observed amplitude of probe oscillation and that of the set point of the feedback controller 30. The controller 30 then generates a z feedback signal, which is used by the image collection processor 32 to construct the image of the sample surface. The z feedback signal is also input to the signal generator 34. The signal generator 34 then derives the instructional signal to be sent to one of the actuation light sources 22 to produce a remodulated output. The remodulated output results in a modulation of the bending pattern of the cantilever, effectively adjusting the z position of the tip in response to feedback as well as maintaining probe oscillation.

The xy scanner 18 drives the probe tip 16a across the surface of the sample, usually following a raster pattern. The scan controller 20 ensures that the tracking system 24 is matched with the scan pattern driven by the scanner 18 such that light from both the actuation sources 22 and the height detection system 26 maintain their position on the probe as it moves. The scan controller 20 may calculate different drive signals for the scanner 18 and tracking system 24 depending on their particular construction and mechanical behaviour. When the tip 16b encounters a part of the surface with, for example, increased height, its motion is changed and the monitored parameter, for example the amplitude of the probe oscillation, moves away from its set point. The feedback controller 30 is set to adjust the vertical position of the probe tip as controlled by one of the light sources 22 to move it away from the sample 14 and so to return the signal received from the detector 28 to its set point. The probe 16 is accordingly maintained in a position at which it has a constant average (over a number of oscillations) interaction with the surface.

Figure 2:
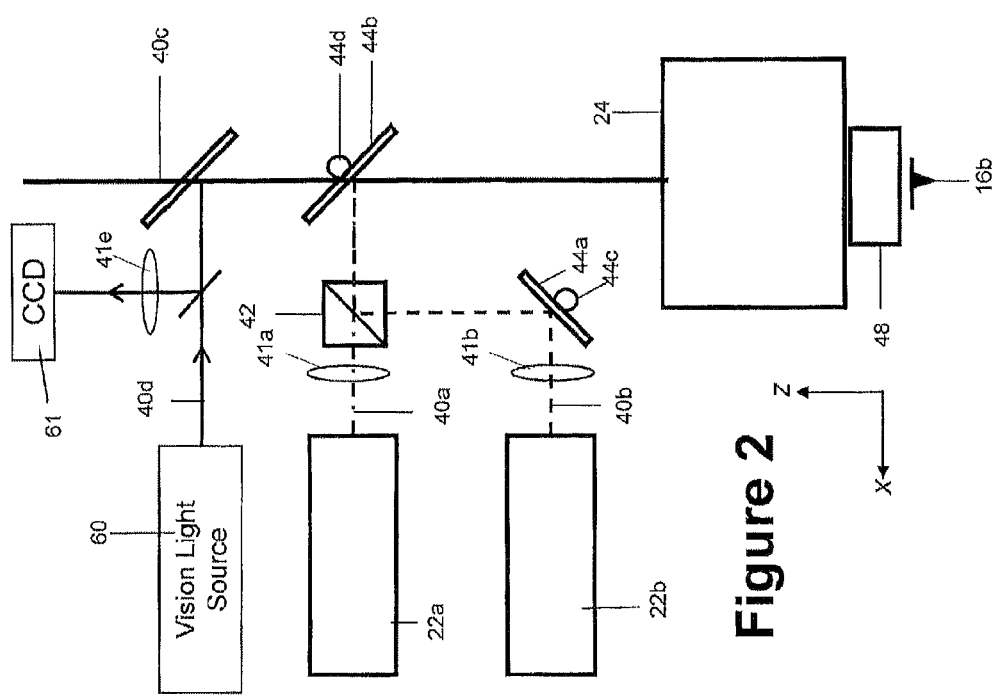
FIG. 2 illustrates the z actuation system of FIG. 1, showing details of a tracking system by which first, second and third laser beams are incident on localised regions of the probe, whilst the probe is scanned across a sample surface.

With reference now to FIG. 2, the features of the z actuation system 22, 24, 34 are shown in more detail. In this example the actuation light sources 22 comprise first and second lasers 22a, 22b that each emit light at the same infrared wavelength, around 810 nm. Light 40a from the first laser 22a is horizontally polarised, whilst the light 40b from the second laser 22b is vertically polarised. The output intensity emitted by both lasers 22a, 22b is independently under the control of the signal generator 34 via respective drive signals.

A polarising beam combiner 42 is arranged such that polarised light 40a, 40b from the two light sources incident at respective faces are directed to exit at a single output face. Specifically, the beam combiner 42 has an internal surface which acts as a mirror 42a arranged at 45° relative to the beam 40a which reflects the S polarisation component of beam 40b but transmits the P polarisation component of beam 40a.

The fact that the beam 40b is S polarised and the beam 40a is P polarised is not to be taken as restrictive. Either polarisation can be used for either beam, or indeed circular polarisations. All that is required is that they are differently polarised in order for them to be combinable in the beam combiner.

A first motorised mirror 44a is steerable by a mirror actuator 44c about two orthogonal axes of rotation to ensure that light 40b from the second laser 22b enters the beam combiner 42 at the required angle and position. Thus the first mirror 44a can be adjusted so that the laser output beams 40a, 40b exit the combiner either substantially parallel or with a small angular difference—this angular difference being more apparent in FIGS. 3 and 4. A third laser beam 40c, for use with the height detection system 26, is also directed by appropriate optics (not shown) to a steering mirror system 46 which is discussed in further detail below.

A second motorised mirror 44b is oriented to direct the combined z actuation beams 40a, 40b towards the tracking system 24. The angle of the second mirror 44b can be adjusted with respect to two orthogonal axes by a mirror actuator 44d so that the laser output beams 40a, 40b enter the tracking system 24 with a small angular difference relative to the beam 40c so that the three beams 40a, b, c enter the tracking system 24 with a small difference in angle between them. When the probe 16 is scanned across the sample surface by the xy scanning system 18, the tracking system 24 is similarly scanned to ensure that the three beams 40a, b, c follow the probe xy position and yet retain their relative displacement.

On exiting the tracking system 24, the beams 40a, b, c are simultaneously directed by an objective lens 48 towards the back of the cantilever 16a. As the beams 40a, 40b, 40c enter the lens system 48 at different angles they are directed on respective laterally displaced locations on the cantilever 16a.

Figure 3A:
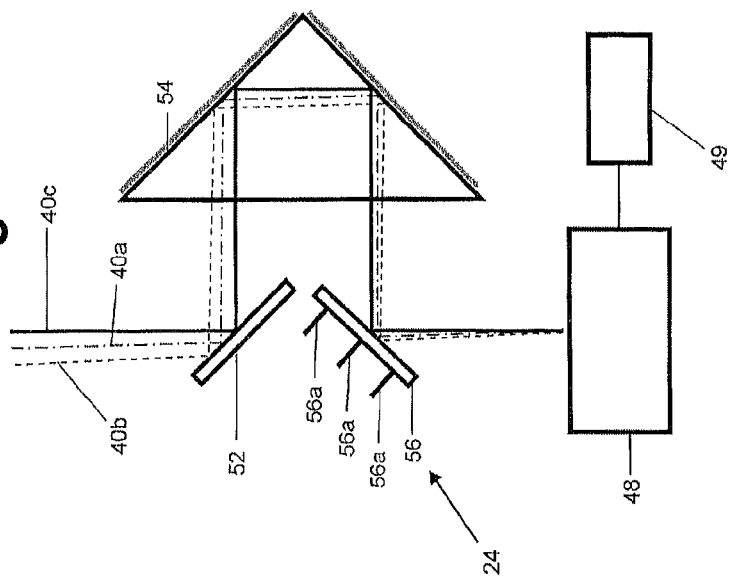
FIG. 3A is an enlarged view of the beam steering system illustrated in FIG. 2.
Figure 3B:
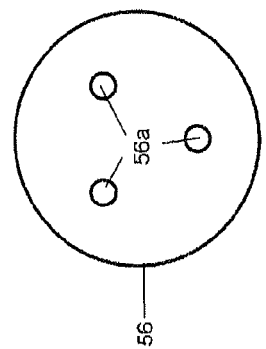
FIG. 3B is a front view of a portion of a component in 3A.

Details of the tracking system 24 are shown in FIGS. 3a and 3b. The beams 40a, 40b, 40c are reflected from a fixed mirror 52 towards a right-angle block 54. The right angle block is oriented such that the beam 40c is incident normally on the entry face. The relative angular displacement of the beams 40a, 40b, 40c is maintained by the right angle block 54. The beams 40a, 40b, 40c then propagate to an adjustable mirror 56 oriented at an angle to the beam 40c. The beams 40a, 40b, 40c are reflected from the mirror 56 towards the objective lens 48. The mirror 56 is mounted on three piezo-electric actuator struts 56a which are separated by 120° round the centre of the mirror as shown in FIG. 3a. The lengths of the three struts 56a can be adjusted together to translate the mirror, or at different rates to rotate or tilt the mirror about two orthogonal axes. That is, the angle of the mirror 56 can be adjusted about the two orthogonal axes by tilting the mirror 56. The rotation about the two orthogonal axes can be controlled independently. As the mirror 56 tilts, the reflected beams 40a, 40b, 40c rotate together, with the result that the angle and point of incidence of each beam is moved laterally across the objective lens 48. Synchronisation of the mirror 56 tilt with the scanning pattern followed by the probe 16 as it is driven by the xy scanner 18 means that the three incident beams 40a, b, c, each retain their position on the probe. The positions of the beams 40a, b, c on the probe are determined only by the angles of incidence of the beams into the lens 48 (and not their points of incidence) so the spacing between the spots on the probe does not change as the points of incidence into the lens change.

It will be appreciated by one skilled in the art that this tracking system 24 can be adapted to allow four, five or more light beams to track a moving cantilever.

FIG. 4 is a schematic view showing the objective lens 48 directing the beams 40a-c into respective spots onto the cantilever 16a. Although the lens 48 is illustrated as a single lens element in FIG. 4, it will be understood that it may comprise an assembly of multiple lens elements. As discussed above the mirrors 44a, 44b are arranged such that the beams 40a-c enter the objective lens 48 at different angles of incidence relative to the optical axis 48a of the lens. As shown in FIG. 4, this results in the beams 40a-c being directed by the objective lens 48 onto the probe at different locations along its length. In this example the beam 40c is parallel with the optical axis 48a. Note that the beams 40a-c each have a diameter which is greater than a quarter of the diameter of the entrance pupil of the objective lens 48.

The optical system is an infinity optical system, so that any collimated beams entering the objective lens 48 will be focused to form a small spot on the probe which is placed at the focal plane of the lens 48. Any convergent or divergent beams entering the objective lens 48 will be defocused to form a larger spot on the probe, which is placed at the focal plane of the objective lens. The positions of the spots on the probe are only dependent on the angles of the beams entering the objective lens 48 and not on their lateral positions. Lenses 41a,b are provided between the lasers 22a,b and the beam combiner 42 for controlling the beam angles of the beams 40a,b (in other words the properties of the lenses 41a,b can be adjusted so that the beams 40a,b are collimated or slightly divergent as they enter the lens 48). An infinity optical system is preferred because it enables the position of these lenses 41a,b to be adjusted and optical components added without affecting the formation of the spots on the cantilever. In an alternative embodiment (not shown) the optical system may be a finite optical system in which each beam is divergent as it enters the lens 48.

FIG. 5 shows schematically the spots on the cantilever 16a illuminated by the beams 40a-c. The centers of the spots are spaced apart, and the spots are non-overlapping. FIG. 5 also shows a large area illuminated by a beam 40d emitted by a vision system light source 60 shown in FIG. 2. This light source 60 is part of a vision system that enables optical alignment of the beams with the probe 16 prior to a scan being performed. Apart from the light source 60, the vision system also has a CCD camera 61, a partially reflective mirror, and a tube lens 41e to form the image on the CCD. The cantilever 16a is mounted on a substrate or probe support 61 and viewed from above (z direction).

The cantilever beam extends along a length of the cantilever beam from a proximal end adjacent to the probe support 61 to a free distal end remote from the probe support. The first spot, nearest the free distal end of the cantilever, is the incident position of the detection laser beam 40c. The detection laser beam 40c is an un-modulated beam which is used to detect the deflection of the back of the probe as the probe tip interacts with the sample surface. Accordingly, it should be positioned close to the tip 16b, on the reverse side of the cantilever. The tip 16b is, for most cantilever designs, towards the free distal end of the cantilever and so the detection laser beam 40c is similarly incident towards the free distal end.

The beam 40a is arranged to drive deflection of the probe (that is, it adjusts the probe—sample separation distance during the course of a scan in accordance with the z feedback signal 31) and illuminates the cantilever at a second spot located intermediate the free distal end and the proximal end/substrate 61.

The beam 40b drives the oscillation of the probe during the course of a scan and is incident towards the proximal end of the cantilever near to the interface of the cantilever 16a and the probe support 61. No part of the radiation beam 40b illuminates the cantilever at a point which is further than 25% along the length of the cantilever from its proximal end.

The heating of the probe caused by the actuation radiation beams 40a,b can damage the probe. This problem is mitigated in two ways. Firstly, the actuation radiation beams 40a,b each have a higher beam angle than the detection radiation beam 40c on entering the lens 48, and consequently they are less convergent than the detection radiation beam 40c on exiting the lens 48. More specifically, referring to FIG. 4, the lenses 41a,b are positioned so that on entering the lens 48 the actuation beams 40*a,b* are slightly divergent (with a positive beam angle) whereas the detection beam 40*c* is collimated (i.e. parallel sided with a beam angle of zero). Consequently, on exiting the lens the beams 40*a-c* are all convergent but the actuation beams 40*a,b* are less convergent than the detection beam 40*c*. The probe is at the focal plane of the lens so the detection beam spot 40*c* is in focus whereas the actuation spots 40*a,b* are not in focus (in other words they are defocused). This defocusing of the actuation beams 41*a,b* means that the two spots on the probe formed by the actuation beams 40*a,b* are larger than the spot formed by the detection beam 40*c*. This larger spot size spreads the energy from the actuation beams over a larger area of the probe. Distributing the energy over a wider area in this way reduces the requirement for intense local heating of the probe and thus of hot spots developing on the probe. Furthermore, the use of larger actuation spots 40*a,b* makes the system less sensitive to precise positioning of these spots.

The spots formed by the beams 40*a* and 40*b* are shown as a similar size in FIG. 4, but the illumination areas (i.e. spot sizes) of these two beams can be different. This difference in spot size can be achieved by defocusing one spot more than the other, or by making one actuation spot focused and the other defocused.

The oscillation beam 40*b* and deflection beam 40*a* may be incident at different positions on the cantilever from those shown, although the locations illustrated are preferred. In particular, it has been found that oscillation of the cantilever is most efficiently excited by directing the oscillation beam 40*b* towards the base (proximal end) of the probe cantilever and near the substrate 61. This enables it to effectively drive the mechanical oscillation of the cantilever.

The large fourth spot is due to the illumination beam 40*d* for the camera 60 that is used to view the cantilever during set up. This can be optionally be turned off during a scan of a sample.

The tracking system 24 illustrated in FIG. 3 is arranged to track all four beams 40*a-d* together, maintaining their longitudinal alignment. In this way, they continue to illuminate the cantilever 16*a*, in the same relative orientation, as the probe is moved during the course of a scan.

FIG. 6 is a graph showing the intensity modulation of the three beams 40*a-c*. The intensity of the oscillation beam 40*b* is modulated by the signal generator 34 in accordance with a first drive signal which is a sine wave 90 at a constant frequency, typically in the range of 10's of kHz to a few MHz, particular details depending on the microscope configuration, mode of operation and particular cantilever. The maximum amplitude of the oscillation of the probe tip 16*b* generated by the first drive signal is typically of the order of 10-200 nm. The intensity of the deflection beam 40*a* is modulated by the signal generator 34 in accordance with a second drive signal to maintain a constant oscillation amplitude of the probe so the tip 16*b* of the probe can track the profile of the sample, in this case changing the second drive signal at 91 as the tip 16*b* of the probe passes over a step in the sample. Typically the step can have a size of the order of microns, so the amplitude of the deflection of the probe tip 16*b* caused by the second drive signal is typically an order of magnitude greater (that is, at least 10 times greater) than the amplitude of the deflection of the probe tip caused by the first drive signal. The detection laser beam 40*c* is un-modulated so has a constant intensity 92.

FIG. 7 shows an alternative probe geometry. In this arrangement, the cantilever is T-shaped with a longitudinal arm 74 extending from the base to the free end and a transverse cross bar 76 at the free end. Although not visible from this plan view, the tip is asymmetrically located on and supported by the cross bar 76. By torsional oscillation it is meant that the cantilever is oscillated about its longitudinal axis to effect a twisting motion. In this way, the offset tip describes a small arc that moves it vertically towards and away from the sample surface. Torsional oscillation of a T-shaped probe may therefore be used as an alternative to flexural oscillation of a standard rectangular probe.

Vertical tip motion established by torsional oscillation offers several advantages over other modes when used in high speed microscope scanning. The torsional resonance is at a higher frequency than the flexural resonance. Ideally, the torsional oscillation frequency is around 0.5-5 MHz and the flexural spring constant is of the order 0.2-2 Nm-1 (these parameters can be controlled by adjusting the dimensions of the cantilever). This means that the rate at which the surface is sampled is higher for torsional operation. This can therefore be used to increase scanning speed or to improve the sensitivity of the detection of the tip-sample interaction forces. Another problem encountered in dynamic imaging is that, on occasion, a large error in the feedback system (arising, for example, from a sudden change in surface height) may result in a large force being applied to the surface as flexural bending (deflection) increases to accommodate the error in the sample—probe base separation. Use of the torsional mode of oscillation to provide the dynamic oscillation means that the stiffness of the flexural bending can be reduced, without any loss of dynamic functionality. This lessens the effect of errors on applied surface force and provides a greater displacement of the probe if flexural bending is required in addition to the torsional mode.

As with the rectangular probe design of FIG. 5, three separate laser beams are directed onto the back of the T-shaped probe in order to excite torsional oscillation. As before, the detection laser beam 40*c* is focused to a spot above the tip of the probe. As the probe tip is offset along the cross bar 76, so too is the detection spot 40*c*. The oscillation beam 40*b* is again directed at the proximal end of the cantilever 74 at the interface between probe and substrate in order to ensure efficient coupling.

As with the embodiment of FIG. 5, no part of the radiation beam 40*b* illuminates the cantilever at a point which is further than 25% along the length of the cantilever 74 from its proximal end. In this embodiment however, the spot 40*b* is offset to the right of the cantilever longitudinal axis. An offset position is found to best excite torsional oscillation. The third beam 40*a* is again directed centrally on the cantilever, intermediate the detection and oscillation beams.

The actuation spots 40*a*,40*b* in FIG. 7 are shown with the same spot size, which is bigger than the size of the detection spot 40*c*. As with the embodiment of FIG. 5 this difference in spot size is achieved by defocusing the actuation spots 40*a,b* relative to the detection spot 40*c*. Optionally the actuation spot 40*b* for exciting the torsional oscillation is more focused (and hence smaller) than the actuation spot 40*a*. A smaller size for the actuation spot 40*b* may be desirable in order to achieve a high degree of offset from the longitudinal axis of the probe 74. A smaller spot 40*b* will also generate more localised stress which is preferred for exciting the torsional mode of resonance. A small focused detection spot 40*c* is shown in this case, although if an optical lever is used to detect movement of the probe then the detection spot 40*c* may be defocused and larger than the actuation spots 40*a,b*.

FIG. 8 shows an alternative design of probe that is responsive to the z actuation system of this invention. In this embodiment, a support 93 supports an array of three cantilever probes 94*a-c* at their proximal ends. Each probe has a wider region 96*a* at its proximal end and a narrower region 98*a* that extends to the free distal end of the probe. Both regions 96a and 98a are coated with a material of different thermal expansivity from the base material.

In this embodiment, a first illumination spot 100, above the position of the tip, is formed by the detection laser. This spot 100 does not drive probe movement. A second spot 102 is directed at the interface between the two sections 96a, 98a of the cantilever. This interface is again an effective coupling site for the energy from the illuminator to excite mechanical oscillations. This spot 102 is accordingly from the laser that drives probe oscillation. A third spot 104 is directed onto the region 96a of the probe, towards the support 93 and the proximal end of the cantilever beam. This laser beam is responsible for probe selection. That is, it is directed onto one of the probes 94a-c in order to lower it out of the plane of the other probes and so select that probe to carry out a scan, the other probes remaining in the same plane as the selected probe carries out a scan. As before, the beam tracking system ensures that all beams maintain a fixed position relative to the probe as it is scanned across a sample. Deflection of the probe to follow the profile of the sample in the first embodiment is driven by a deflection beam 40a. In the case of FIG. 8 this profiling deflection can be driven by a fourth spot (not shown) between the spots 100 and 102; by the spot 104 (in addition to its probe selection function); or by another actuation mechanism such as a piezoelectric actuator.

The probe selection beam 104 needs to move the cantilever over a wider range of motion than the oscillation beam 102. Specifically a maximum amplitude of deflection of the probe caused by the selection beam 104 is at least ten times larger than a maximum amplitude of deflection of the probe caused by the oscillation beam 102. Therefore the selection beam 104 must heat the cantilever by a significant amount. Such a large degree of heating can damage the probe. This problem is mitigated in two ways. Firstly, the selection beam 104 is more defocused than the oscillation beam 102 so it illuminates the probe over a wider area which tends to reduce the chance of damage. Secondly the selection beam 104 is positioned closer to the support 93 than the oscillation beam 102, and the support 93 acts as a heat sink.

The oscillation beam 102 is preferably focused (or at least more focused than the selection beam 104) so it is smaller. A smaller and more focused spot for the oscillation beam 102 is preferred so the spot can be accurately positioned to excite a particular mode of oscillation (for instance by being positioned at a node or anti-node, or to excite a torsional mode).

In the embodiments of FIGS. 5 and 7, no part of the radiation beam 40b illuminates the cantilever at a point which is further than 25% along the length of the cantilever 74 from its proximal end. In the embodiment of FIG. 8, a majority of the selection beam 104 illuminates the cantilever at a point which is no further than 25% along the length of the cantilever from the proximal end.

The ratio of the difference in area between the illumination spots 102, 104 is typically greater than 1.5, and preferably greater than 2. In other words if the area of the smaller one of the spots 102 is A, and the area of the larger one of the spots 104 is B, then the ratio B/A is typically greater than 1.5 and preferably greater than 2. In the example of Figure the ratio B/A is of the order of 3. The area of the spots can be defined in a number of ways, such as the illumination area where the intensity of the spot is above 90% of its maximum intensity.

FIG. 9 shows an alternative optical arrangement in which only a single modulated beam 110 is used instead of two modulated beams 40a,b as above. In this example the angle of incidence of the beam 110 into the lens 48 is switched between two angles 112, 114 by a modulator 111 so as to sequentially illuminate the probe with the beam 110 at two different locations on the probe. The modulator 111 is preferably an electro-optical-modulator or an acousto-optical-modulator. The modulator 111 is able to switch the angle sufficiently frequently that the probe does not cool down significantly between illuminations cycles at each angle. For instance the switching time between locations on the probe is preferably less than the thermal time constant of the locations on the probe. When the beam 110 is directed at the angle 112 then it is modulated to deflect the probe to follow the profile of the sample, and when it is directed at the angle 114 it is modulated to oscillate the probe.

In the example above the beam 110 is modulated synchronously with the location being addressed by the beam. That is, when the beam 110 is directed at the angle 112 a first modulation is applied to vary the intensity of the beam, and when the beam is directed at the angle 114 a second modulation is applied to vary the intensity of the beam. The heating of the two locations can also be modulated by controlling the amount of time that the beam spends at each location, in a similar manner to pulse-width modulation. That is, as the beam switches between the two locations the amount of time that it spends at each location can be varied over time, and thus the average power being transferred to each location will vary. In order to enable the two locations to be modulated independently, the beam may also be directed to a third location as part of the switching cycle, where that third location is either off the probe or part of the probe with no thermal response.

In a further alternative example the modulation of the beam 110 may not be varied synchronously with the location being addressed by the beam. In this example the beam 110 is continuously scanned over the surface of the cantilever for the purpose of distributing energy over a wide area rather than for the purpose of heating two locations differently. The intensity of the beam 110 is modulated as it scans over the surface (for instance for the purpose of oscillating the probe) but the intensity of the beam 110 is not modulated synchronously with the scanning motion. In other words it is not modulated at a first one of the locations in accordance with a first drive signal and at a second one of the locations in accordance with a second drive signal—rather it is modulated in accordance with a single drive signal only (for instance a sine wave of constant frequency) regardless of the angle of the beam.

For ease of illustration, in the embodiment of FIG. 9 the detection beam is not shown. However a detection beam will also be required, along with various other additional items shown in FIG. 2. The modulator 111 replaces items 42, 44a and 44c in FIG. 2. Thus the tracking system 24 is not replaced by the modulator 111, so the mirror 56 continues to be used to track the raster scanning motion of the probe.

As with the other embodiments described above, the detection beam in the embodiment of FIG. 9 is focused to a relatively small spot. The beam 110 may be slightly divergent so that it forms a defocused actuation illumination area on the probe at each angle 112, 114. Thus the probe area illuminated by the defocused beam 110 at each angle 112, 114 is larger than the detection illumination area illuminated by the focused detection beam.

Alternatively, in the case where the beam 110 is continuously scanned over the surface of the probe for the purpose of distributing energy over a wide area, then the beam 110 may be collimated so that it forms a focused spot on the probe at any one time, but this small focused spot is scanned over a wide area which makes the overall actuation illumination area illuminated by the focused actuation beam 110 larger than the detection illumination area illuminated by the focused detection beam. This scanning motion spreads the energy from the actuation beam over a larger area of the probe. This reduces the chance of thermal damage and can create more effective motion control.

Two examples of this continuous scanning motion are shown in FIGS. 10 and 11. These are similar to FIG. 8 and equivalent elements are given the same reference number. The large defocused spot 104 in FIG. 8 is replaced by a small focused spot 104*a* which is continuously scanned to cover a large part of the region 96*a* of the probe towards its proximal end. The path of motion of the flying spot is shown in dotted lines 105,106. In the example of FIG. 10 the scanning spot 104*a* describes a Lissajous FIG. 105, and in FIG. 11 it describes a raster pattern 106. The speed of the spot is typically of the order of 1-100 m/s. In the case of a probe with a width of 50 micrometers, and a speed of 50 m/s, this will enable the flying spot to travel across the full width of the probe in about 1 microsecond which is typically less than the thermal time constant of the probe. The path of motion of the flying spot extends between about 10% and 40% of the length of the cantilever beam, measured from its proximal end.

The previous embodiments described in FIGS. 5, 7 and 8 use a large stationary spot to spread the energy from the actuation beam over a larger area of the probe, thereby coupling the energy more effectively into the probe and making the system less sensitive to precise positioning of the spot. The embodiments of FIGS. 10 and 11 solve the same problem in a different way—rather than increasing the illumination area by increasing the size of the spot they increase the illumination area by moving the spot.

FIG. 12 shows an alternative actuation arrangement in which a spatial light modulator (SLM) 120 is used to transform an input beam 121. The input beam 121 has a typical Gaussian intensity profile, and is transformed into an output beam 122 which forms a rectangular spot 122 on the probe as shown in FIG. 13, matching the shape of the proximal region 96*a* of the probe and hence coupling energy more effectively and uniformly into the probe, generating more uniform stress. The circular shape of the input beam 121 is shown in dotted lines in FIG. 13 by way of comparison. That is, in the absence of the SLM 120 the input beam 121 would form a circular spot on the probe which is less well matched to the probe shape. The SLM 120 distributes the energy of the input beam over the surface of the probe in a more effective way. Optionally an EOM or AOM may be added to the arrangement of FIG. 12 to adjust the angle of the output beam 122, thereby tracking the scanning motion of the probe. Optionally a modulator such as an EOM or AOM may also be used to modulate the intensity of the input beam 121 (in which case the modulator is placed upstream of the SLM 120) or to modulate the intensity of the output beam 122 (in which case the modulator is placed downstream of the SLM 120 between the SLM and the objective lens).

As well as transforming the shape of the spot, the SLM 120 can also transform the radial intensity profile of the radiation beam as shown in FIG. 14. FIG. 14 is a graph of radiation intensity versus radial position across the width of the beams 121, 122. The input beam 121 has an intensity profile 130 across its width which is approximately Gaussian. The SLM 120 redistributes the energy so that the transformed output beam 122 has a "top-hat" intensity distribution, with a flatter peak 132 than the peak of the Gaussian intensity profile 130.

The SLM 120 is employed for the flexibility and ease of integration into an optical system while allowing computer control for rapid alignment. A brief description of the principles of the SLM 120 follows. Suitable SLMs are supplied by Boulder Nonlinear Systems, Colorado, USA such as their XY Series products and Hamamatsu such as their X10468 Series products. Other suitable DOEs are available from HOLO/OR Ltd., P.O. Box 1051, Rechovot, ISRAEL, see www.holoor.co.il.

In an exemplary SLM, in order to modulate the phase of incident light, a nematic liquid crystal SLM is aligned in a planar conformation. Here the liquid crystal director (i.e. long axis of the molecules) is oriented parallel to the polarization of the incident light. Upon application of a voltage, the molecules tilt in a direction parallel with the direction of propagation of the optical field. This causes the incident light to encounter a reduced refractive index. The change in refractive index translates directly to a change in the optical path, and consequently a phase shift for the incident light. If enough voltage is applied, the variation in refractive index ranges from the extraordinary index (for no applied voltage) to the ordinary index (maximum tilt of the molecules). A typical change in the refractive index for maximum applied voltage is 0.2. In the preferred embodiment the SLM 120 uses very large scale integration (VLSI) to address an array of liquid crystal modulators. The VLSI addressing allows for multiplexing to achieve individually addressable pixels across the entire optical aperture. This flexibility results in a randomly addressable phase mask that acts as an optical phased array with the potential for phase correction. The SLM optical head itself consists of a layer of liquid crystal sandwiched between a cover glass and a VLSI backplane.

Optionally the SLM 120 can be operated to change over time the transformation applied to the input beam as the transformed output beam 122 is directed onto the surface of the probe. As a result the size, circumferential shape or intensity profile of the illumination spot 122 can be changed over time as required. The intensity of the input beam 121 is typically also changed with respect to time by modulation of the light source or by using an optical modulator such as an AOM or EOM. Alternatively the intensity of the probe illumination may be changed with respect to time by using an optical modulator (such as an AOM or EOM) between the SLM 120 and the objective lens.

FIGS. 15-18 shows a further alternative method of actuating the probe of FIG. 7—equivalent elements from FIG. 7 being given the same reference number. The oscillation beam 40*b* is continuously scanned across the probe by an AOM or EOM so that its X position moves back and forth in a sinusoidal manner as shown in FIG. 18. The Y position remains constant so the flying spot moves back and forth in a straight line. At time t0 the flying spot 40*b* is positioned on the right of the probe as shown in FIG. 15, at time t1 it is positioned at the centre of the probe as shown in FIG. 16, and at time t2 it is positioned on the left of the probe as shown in FIG. 17. The frequency of the back and forth motion is tuned to a frequency of the torsional oscillation of the probe. The intensity of the flying spot may be modulated as it moves, or the intensity may remain constant with time.

Figure 19:
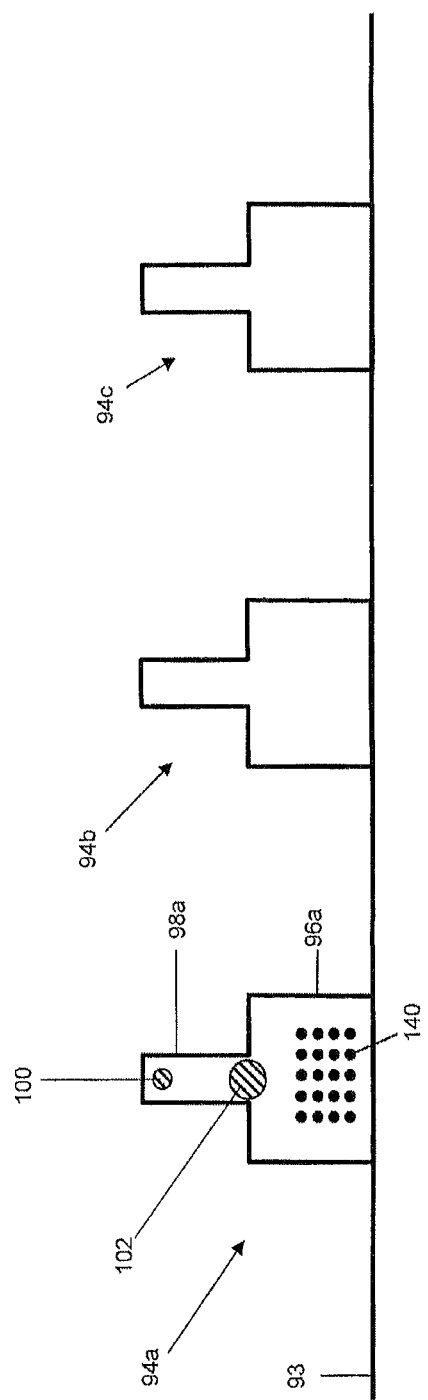
FIG. 19 shows an alternative arrangement in which the probe is illuminated by an array of stationary beamlets.

FIG. 19 shows a further embodiment in which the SLM 120 transforms the input beam 121 into beamlets which form an array of spots 140 on the probe 96*a*. Thus rather than distributing the energy of the input beam over a single large continuous spot, the energy is distributed by the SLM 120 over the probe in an array of distinct spots or maxima 140.

As noted previously, probe motion in the z direction during a conventional AFM scan comprises two components: an oscillating component that is used to monitor probe—sample interaction and a z positioning component that is used to adjust probe—sample separation in response to a feedback signal in order to ensure that average interaction is maintained at a constant level. In the FIG. 1 embodiment of this invention, a single actuation system is used to drive all probe motion in the z direction. The feedback component of the drive signal is used to construct the image.

In the above-described embodiments the height detection system 26 was based on deflection detection using an optical lever (which measures the angle of the probe). Alternative height detection systems, for example those based on interferometry, may also be used. Such a detection system includes a light source that emits a laser beam, which is focused onto an upper surface of the tip end of the cantilever, and a reference beam, which is reflected from an upper surface of the stage. On reflection, these light beams propagate to a probe height detector, which includes an interferometer. The laser light is sufficiently coherent that an interference pattern is generated between the light reflected from the cantilever and the reference beam. This provides a measure of a path difference or change in the path difference between the two beams and hence an indication of the instantaneous height of the back of the cantilever above the stage surface.

The position of the detection spot 40c (directly above the probe tip in FIGS. 4, 6 and 7) is particularly preferred for the case where the detection system 16 is an interferometric detection system which directly measures the height of the tip of the probe. However if the detection system 16 is an optical lever (which measures the angle of the probe) then the position of the detection spot 40c is less critical, for example it can be placed anywhere across the cross bar 76 for the T-shaped probe as in the case of FIG. 7. A larger detection spot 40c may also be suitable in this case.

In the embodiment of FIG. 12 only a single SLM 120 is shown. However in an alternative embodiment multiple SLMs may be provided, one per actuation beam.

Although the invention has been described above with reference to one or more preferred embodiments, it will be appreciated that various changes or modifications may be made without departing from the scope of the invention as defined in the appended claims.

The invention claimed is:

1. A scanning probe microscope comprising:
   a probe; and
   an actuation system for driving the probe, the actuation system including:
      an optical system arranged to direct a radiation beam onto the probe so as to cause the probe to deform; and
      a scanning system arranged to scan the radiation beam over the surface of the probe during a scanning operation.

2. The microscope of claim 1 further comprising a modulation system arranged to modulate the intensities of the radiation beam.

3. The microscope of claim 1, wherein the probe comprises a cantilever which extends along a length of the cantilever from a proximal end adjacent to a probe support to a distal end remote from the probe support; wherein the optical system is arranged to direct the radiation beam onto the cantilever so that at least part of the radiation beam is incident on the cantilever towards the proximal end, and preferably at least part of the radiation beam is incident on the cantilever at a point which is less than 25% along the length of the cantilever from the proximal end.

4. The microscope of claim 1 further comprising a probe support; wherein the probe has a proximal portion adjacent to the probe support and a distal portion remote from the probe support which is narrower than proximal portion; and wherein the optical system is arranged to direct the radiation beam onto the proximal portion of the probe.

5. An actuation system for driving a probe of a scanning probe microscope, the system comprising:
   a modulation system arranged to modulate the intensities of first and second radiation beams; and
   an optical system arranged to direct the first and second radiation beams onto the probe to form respective first and second illumination areas on the probe, wherein the first illumination area has a different size, shape or intensity profile than the second illumination area, wherein the optical system comprises a lens arranged to receive the first and second radiation beams and direct them onto the probe to form the first and second illumination areas, and wherein the optical system is arranged to direct the first and second radiation beams so that they enter the lens at different angles of incidence relative to its optical axis.

6. The actuation system of claim 5 wherein the modulation system is arranged to modulate the intensity of the first and second beams differently.

7. The actuation system of claim 5 wherein the optical system is configured so that one of the illumination areas is more focused than the other.

8. The actuation system of claim 5 wherein the modulation system is arranged to modulate the intensity of the first radiation beam in accordance with a first drive signal, and the modulation system is arranged to modulate the intensity of the second radiation beam in accordance with a second drive signal which is different to the first drive signal.

9. The actuation system of claim 5 wherein the optical system comprises a diffractive optical element arranged to diffract an input beam to generate the first or second radiation beam.

10. The actuation system of claim 5 further comprising a scanning system arranged to scan the first or second radiation beam over the surface of the probe.

11. A scanning probe microscope comprising a probe; and an actuation system according to claim 5.

12. The microscope of claim 11, wherein the probe comprises a cantilever which extends along a length of the cantilever from a proximal end adjacent to a probe support to a distal end remote from the probe support; and wherein the optical system is arranged to direct one of the radiation beams onto the cantilever so that at least part of the one of the radiation beams is incident on the cantilever towards the proximal end, and preferably at least part of the one of the radiation beams is incident on the cantilever at a point which is less than 25% along the length of the cantilever from the proximal end.

13. The microscope of claim 11 further comprising a probe support; wherein the probe has a relatively wide proximal portion adjacent to the probe support and a relative narrow distal portion remote from the probe support; and wherein the optical system is arranged to illuminate the proximal portion of the probe with one of the beams over a larger illumination area and the distal portion of the probe with the other one of the beams over a smaller illumination area.

14. An actuation system for driving a probe of a scanning probe microscope, the system comprising:
   a modulation system arranged to modulate the intensities of first and second radiation beams; and
   an optical system arranged to direct the first and second radiation beams onto the probe to form respective first and second illumination areas on the probe, wherein the first illumination area has a different size, shape or intensity profile than the second illumination area, wherein the optical system comprises a lens arranged to receive the first and second radiation beams and direct them onto the probe to form the first and second illumination areas, and wherein the optical system is configured so that the first radiation beam has a different beam angle than the second radiation beam on entering the lens, and consequently has a different degree of convergence than the second radiation beam on exiting the lens.

15. An actuation system for driving a probe of a scanning probe microscope, the system comprising:
a modulation system arranged to modulate the intensities of first and second radiation beams; and
an optical system arranged to direct the first and second radiation beams onto the probe to form respective first and second illumination areas on the probe, wherein the first illumination area has a different size, shape or intensity profile than the second illumination area, wherein the modulation system is arranged to modulate the intensity of the first radiation beam to select the probe by lowering it out of the plane of an array of probes, and the modulation system is arranged to modulate the intensity of the second radiation beam to oscillate the probe.

16. A scanning probe microscope comprising:
a. a probe;
b. an actuation system for driving the probe, the actuation system comprising an actuation illumination system which is arranged to illuminate the probe with an actuation radiation beam to form an actuation illumination area on the probe, and a modulation system which is arranged to modulate the intensity of the actuation radiation beam; and
c. a detection system for detecting movement of the probe, the detection system comprising a detection illumination system which is arranged to illuminate the probe with a detection radiation beam to form a detection illumination area on the probe, wherein the detection radiation beam is reflected by the probe to form a reflected detection radiation beam, and the detection system further comprises a detector which is arranged to receive the reflected detection radiation beam and generate an output that is representative of the movement of the probe,
wherein the actuation illumination area has a different size, shape or intensity profile than the detection illumination area, and wherein the actuation system and the detection system are configured so that the actuation radiation beam has a higher beam angle than the detection radiation beam on entering the lens, and consequently is less convergent than the detection radiation beam on exiting the lens.

17. The microscope of claim 16 further comprising a lens arranged to receive the actuation radiation beam and the detection radiation beam and direct them onto the probe to form the actuation and detection illumination areas.

18. The microscope of claim 16 wherein the actuation system and the detection system are configured so that the detection illumination area is smaller than the actuation illumination area.

19. The microscope of claim 16, wherein the probe comprises a cantilever which extends along a length of the cantilever from a proximal end adjacent to a probe support to a distal end remote from the probe support; wherein the actuation illumination system is arranged to direct the actuation radiation beam onto the cantilever so that at least part of the actuation radiation beam is incident on the cantilever towards the proximal end, and preferably at least part of the actuation radiation beam is incident on the cantilever at a point which is less than 25% along the length of the cantilever from the proximal end.

* * * * *